United States Patent Office 3,717,498
Patented Feb. 20, 1973

3,717,498
METHOD FOR TREATING THE SURFACE OF A CONTAINER AND A CONTAINER PRODUCED BY THE METHOD
Ilse Franz and Werner Langheinrich, Ulm (Danube), Germany, assignors to Telefunken Patentverwertungsgesellschaft m.b.H., Ulm (Danube), Germany
No Drawing. Continuation of abandoned application Ser. No. 721,075, Apr. 12, 1968. This application Feb. 12, 1971, Ser. No. 115,096
Claims priority, application Germany, Apr. 13, 1967, T 33,647
Int. Cl. F27b 14/00
U.S. Cl. 117—70 A                3 Claims

ABSTRACT OF THE DISCLOSURE

A method for treating the surface of a container and a container which has been treated according to the method. The method involves coating at least the inside surface of a container with a layer of a diffusion-preventative substance. The container, which can be made of quartz, glass or a ceramic material, can then be used to hold products to be annealed in a heat-treating furnace without diffusions out of or into the container walls.

CROSS-REFERENCE TO RELATED APPLICATION

This application is a continuation of application Ser. No. 721,075 filed Apr. 12, 1968, now abandoned.

BACKGROUND OF THE INVENTION

The present invention relates to a method for treating the surface of a quartz, glass or ceramic container that is exposed to annealing processes, as well as to such container.

High-temperature resistant materials, such as quartz, glass or ceramics, are often used to make the walls of containers for holding products to be annealed. It is common, for example, to use tubes of quartz in the manufacture of semiconductor elements to hold the semiconductor material while it is being annealed. In this type of treatment—e.g. in the practice of the planar techniques of semiconductor manufacture—the material is inserted in the quartz tube and the entire tube exposed to a high annealing temperature in an annealing furnace.

It has been shown, in practice, that quartz, glass or ceramic containers diffuse out certain materials at high temperatures which disadvantageously influence the products to be annealed inside the container. For example, if a quartz tube is raised to a high temperature, it can cause sodium to diffuse out and to impair the electrical properties of the semiconductor material contained therein.

SUMMARY OF THE INVENTION

An object of the present invention, therefore, is to find a method of treating the surface of a container made of quartz, glass or ceramics so that this container will not give rise to the problems described above.

This as well as other objects which will become apparent in the discussion that follows is achieved, according to the present invention, by coating at least the inside surface of the quartz, glass or ceramic container with a layer of a diffusion-preventative substance. This layer will thus act to hinder the emergence of undesirable substances such as sodium vapors from the container walls at high temperatures.

DESCRIPTION OF THE PREFERRED EMBODIMENTS

According to a preferred embodiment of the present invention, at least the inside surface of a container is coated with a thin silicon nitride layer. When applied as a layer of insulation, silicon nitride exhibits by far the lowest permeability to impurities such as alkali atoms.

The advantage of the method and the container according to the present invention is that they prevent the issuance of undesired materials from the container walls at high temperatures; in particular, they hinder the diffusion of sodium out of as well as the diffusion of contaminants—e.g. from the furnace material—into the container material—e.g. incandescent quartz—when the container is used to hold products to be annealed.

The surface-treating method according to the present invention may be applied to tubes, containers, holders and the like made of quartz, glass or ceramics.

Since the silicon nitride coating prevents injurious substances, such as the alkali metals, from diffusing into the container, it will also retard the devitrification process and considerably improve the durability of the parts made of quartz, glass or ceramic material which it covers. The containers or quartz tubes which are treated, according to the present invention, will thus be assured an increased service life.

The thickness of the silicon nitride layer applied to the container according to the present invention should preferably be between 0.1 and 0.5 micron.

A preferred application of the method and container according to the present invention is found—as described above—in the manufacture of semiconductor elements which are heat-treated or annealed inside of a quartz, glass or ceramic receptacle. By treating the surface of the receptacle in accordance with the present invention, it is possible to prevent the detrimental impurities from reaching the semiconductor elements enclosed in the vessel. It has been shown in practice that a layer of silicon nitride acts as a getter not only for sodium but also, in the same manner, provides a good mask for a series of other elements, such as boron, phosphorus, oxygen, gallium, arsenic, indium, etc.

The silicon nitride layer can, as a rule, be applied to the container, e.g. the quartz tube, during its manufacture. It is also possible, however, to apply this diffusion-preventative layer to a quartz tube which is already in use as a container in an annealing furnace. In particular, the diffusion-preventing layer can be deposited from its gaseous state on the inside surface of the quartz tube while the tube is in the annealing furnace.

A stream of nitrogen saturated with $SiCl_4$ or a stream of $SiH_4$ diluted with nitrogen is passed through the quartz tube which must have a temperature between 500 and 1000° C. When $NH_3$ is added to the gas stream a thin layer of silicon-nitride will be formed. By adding of oxygen, a thin layer of silicon-oxide can be deposited too.

According to another embodiment of the present invention, the surface of the container—e.g., the inside surface of a quartz tube—which is coated with a layer of silicon nitride is additionally coated with an approximately 1-micron-thick layer of silicon dioxide. This additional coating inhibits the diffusion of oxygen into the container walls when the annealing processes are not carried out in an oxygen-free atmosphere.

Any substance may be used as a diffusion preventative, according to the present invention, which exhibits a low permeability for the particular impurities, the diffusion of which is to be inhibited. If the container is to be subjected to high temperatures, the substance must also exhibit the necessary temperature resistance. Listed in the following table, by way of example and not of limitation, are a number of substances which may serve to prevent diffusion.

TABLE I

| Substance | Materials for which diffusion is inhibited | Thickness, μ |
|---|---|---|
| Silicon nitride | K, Na, B, P, O₂, In, Ga, As | 0.1–0.5 |
| Boron nitride | K, Na, B, P, O₂, In, Ga, As | 0.1–0.5 |
| Zirconium nitride | K, Na, B, P, O₂, In, Ga, As | 0.1–0.5 |
| Titanium nitride | K, Na, B, P, O₂, In, Ga, As | 0.1–0.5 |

It will be understood that the above description of the present invention is susceptible to various modifications, changes and adaptations, and the same are intended to be comprehended within the meaning and range of equivalents of the appended claims.

What is claimed is:

1. A container at least the inside surface of which is coated with a coating, the container being composed of a material selected from the group consisting of quartz, glass and ceramic and thus of a material which is high-temperature resistant and which contains elements which diffuse therefrom, diffusion of the elements from said material being inhibited by the coating, said coating comprising two layers, the first layer being a nitride selected from the group consisting of silicon nitride, boron nitride, zirconium nitride and titanium nitride, which prevents diffusion of the elements from said material, and the second layer being of silicon dioxide which prevents diffusion of oxygen into said material.

2. A container according to claim 1, wherein both inside and outside surfaces of said container are coated with the nitride.

3. A container according to claim 1, wherein the nitride is silicon nitride.

References Cited

UNITED STATES PATENTS 3,465,209  9/1969  Denning et al. ____ 117—Dig. 12

RALPH S. KENDALL, Primary Examiner

C. K. WEIFFENBACH, Assistant Examiner

U.S. Cl. X.R.

13—35; 117—69, 94, 97, 106; 263—47, 48; 266—43